Figure 1:
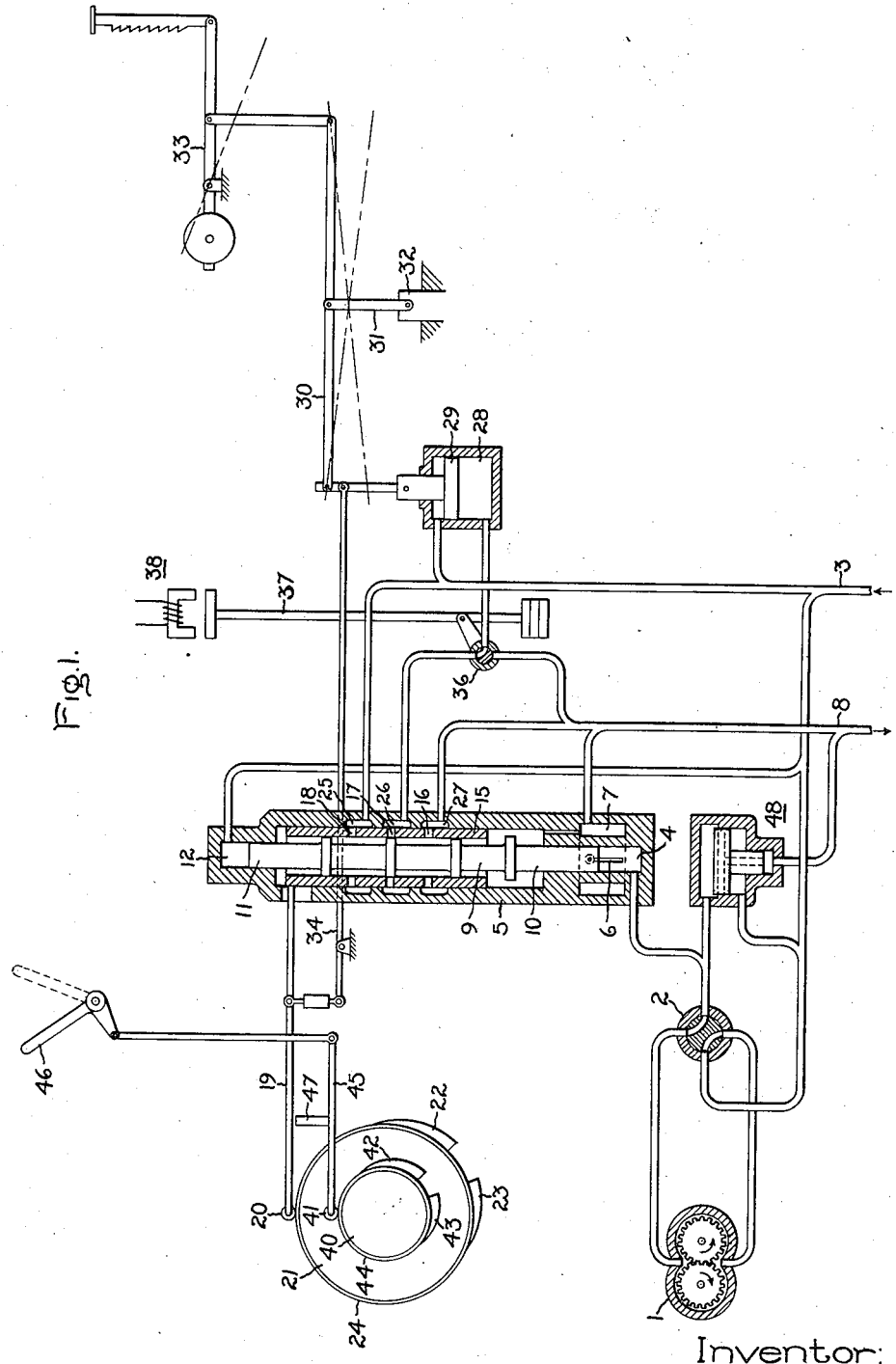

Patented Oct. 29, 1935

2,019,322

UNITED STATES PATENT OFFICE 2,019,322

BRAKING EQUIPMENT

David M. Smith, Stretford, England, assignor to General Electric Company, a corporation of New York Application October 18, 1934, Serial No. 748,901 In Great Britain October 25, 1933

11 Claims. (Cl. 192—144)

This invention relates to braking equipments for winding, hoisting, hauling and like installations and is also applicable for controlling the speed of moving apparatus of any kind.

The object of the invention is to provide improved equipments for controlling the speed of the moving apparatus over a very wide speed range. For example in a mine winding installation the safe speed of the cage in the middle part of the wind is frequently eighty feet per second or higher, whereas the speed when the descending cage reaches the bank should be less than two feet per second in order to avoid severe bumping. During the deceleration portion of the wind, considerations of safety require that the permitted maximum speed of the cage should be co-related with the position of the cage in the shaft over the whole speed range, for example from eighty to two feet per second.

In the improved equipment according to the present invention fluid taken from a pressure source and discharged to an exhaust is circulated through a system comprising a metering device or pump, hereinafter for convenience referred to simply as a pump, which passes the fluid at a rate substantially proportional to or representative of the speed of the cage or other moving apparatus, but imposes a positive or negative pressure difference on the circulating fluid which is small in comparison with that between source and exhaust, and in series with said pump a throttling orifice the size of which is controlled by a piston member in equilibrium under the differential pressure across the metering device or pump, the piston member cooperating with an independently actuated sleeve member to constitute in combination therewith relay means for controlling or regulating by the movement of said piston member relatively to said sleeve member, the application of braking effect. For example, a pump of the type which can be geared to so as to be driven by the winder drum, may be employed.

The invention further comprises an improved equipment in which a pump is adapted to be driven at a speed proportional to or representative of that of the cage or other moving apparatus, and delivers fluid under pressure to a cylinder which is provided with a discharge orifice the size whereof is regulated by a piston operating in the cylinder under the differential action of the pressure of fluid supplied to the cylinder by the metering device or pump and the pressure of fluid on the inlet side of the latter, so that the position of said piston is substantially dependent upon the speed of the cage or other moving apparatus at all speeds thereof. Relay means are provided for regulating the application of the brake, which relay means is actuable by said piston at a setting which is variable in accordance with the position of the cage or other moving apparatus. By this means as and when the speed of the cage or other moving apparatus exceeds a certain prescribed limit which depends upon the position of the cage or other moving apparatus in its travel the brake is applied.

With an arrangement in accordance with the invention, the head developed by the pump is substantially all velocity head and is therefore substantially independent of the viscosity of the pressure fluid. Consequently the rate of flow of fluid supplied by the pump to the cylinder will depend upon the speed of the pump and hence on the speed of the cage or other moving apparatus for substantially all normal working speeds thereof. Clearly the piston may be arranged so as to be subject to any desired bias, the position of equilibrium under any particular condition being then modified.

In practicing the invention, brake regulating relay means may be employed comprising a plunger connected to, or otherwise forming part of, the piston whose position is dependent upon the speed of the cage or other moving apparatus, and an associated ported sleeve member whose position varies in accordance with the position of the cage or other moving apparatus in its travel. Conveniently the ported sleeve member is arranged to cooperate with the plunger to control the supply of pressure fluid to, and discharge of fluid from, a fluid operated relay, thereby to cause the application of the brake with a braking effect which is variable in accordance with the relative displacement between the plunger and the ported sleeve member.

In braking equipments wherein it is desired to apply the brake with full braking effect if a condition of emergency should arise a valve may be provided in the connection between the brake regulating relay means and the fluid operated relay for controlling the brake. Said valve may be operated, for instance, by an emergency solenoid in such manner that if the electrical supply to the solenoid is interrupted (corresponding to the occurrence of the emergency condition) the valve is operated to cause discharge of fluid from said fluid operated relay, independently of the action of the brake regulating relay means, thereby to cause the brake to be applied with full braking effect.

Where it is desired to impose a rate of deceleration on the cage or other moving apparatus which is lower at some times than at other times, such as when the cage is used for raising or lowering men, as distinguished from other times when it is used for raising or lowering material, the control of the setting of the brake regulating relay means, for example the positioning of the ported sleeve which cooperates with the plunger in the actuation of said relay means, may be transferred from one cam means to another having a suitably different profile. This may readily be effected by means of a manually actuable control lever which is operably connected to levers which are associated with the ported sleeve and operated by the respective cams and when actuated removes one lever from engagement with its cam and brings the other into engagement with the respective cam.

In such installations where the directional rotation of the pump is reversed with the cage or other moving apparatus a changeover valve may be included in the fluid circulating system of the pump so as to be actuated from one position to the other corresponding to the rotational direction of the pump, thereby to interchange the inlet and outlet sides of the pump. If the pump rotation is reversed but the valve is not changed over the pump would tend to withdraw fluid from the cylinder in which is disposed the piston for operating the brake regulating means. In order to prevent suction of air through leakage spaces into the cylinder under these circumstances a reverse relief valve may be provided which opens when the pressure in the cylinder falls to a predetermined fraction of the pressure of the fluid supply, that is the pressure at the outlet side of the pump when the rotational direction of the pump is thus reversed, thereby to pass recirculated fluid through the pump. The changeover valve may be actuated by automatic means in accordance with the direction of movement of the cage. Preferably, the actuating means may be so arranged as to restrain the changeover valve in the position corresponding to the cage or other moving apparatus approaching the limit of its travel, but in the middle portion of the travel to set the valve in a position corresponding to the direction of movement of said cage or other moving apparatus, that is to the direction of rotation of the pump. The object of this arrangement is to prevent unnecessary limitation of speed by operation of the brake regulating relay means when the cage or other moving apparatus is just moving away from the limit of its travel in one direction as there is no danger in high acceleration away from the limit of travel, although safety conditions require that the cage or other moving apparatus should be brought slowly towards said limit.

Although the invention is applicable to other installations than winders, for the sake of simplicity only winders will be referred to in the following description.

Figure 2:
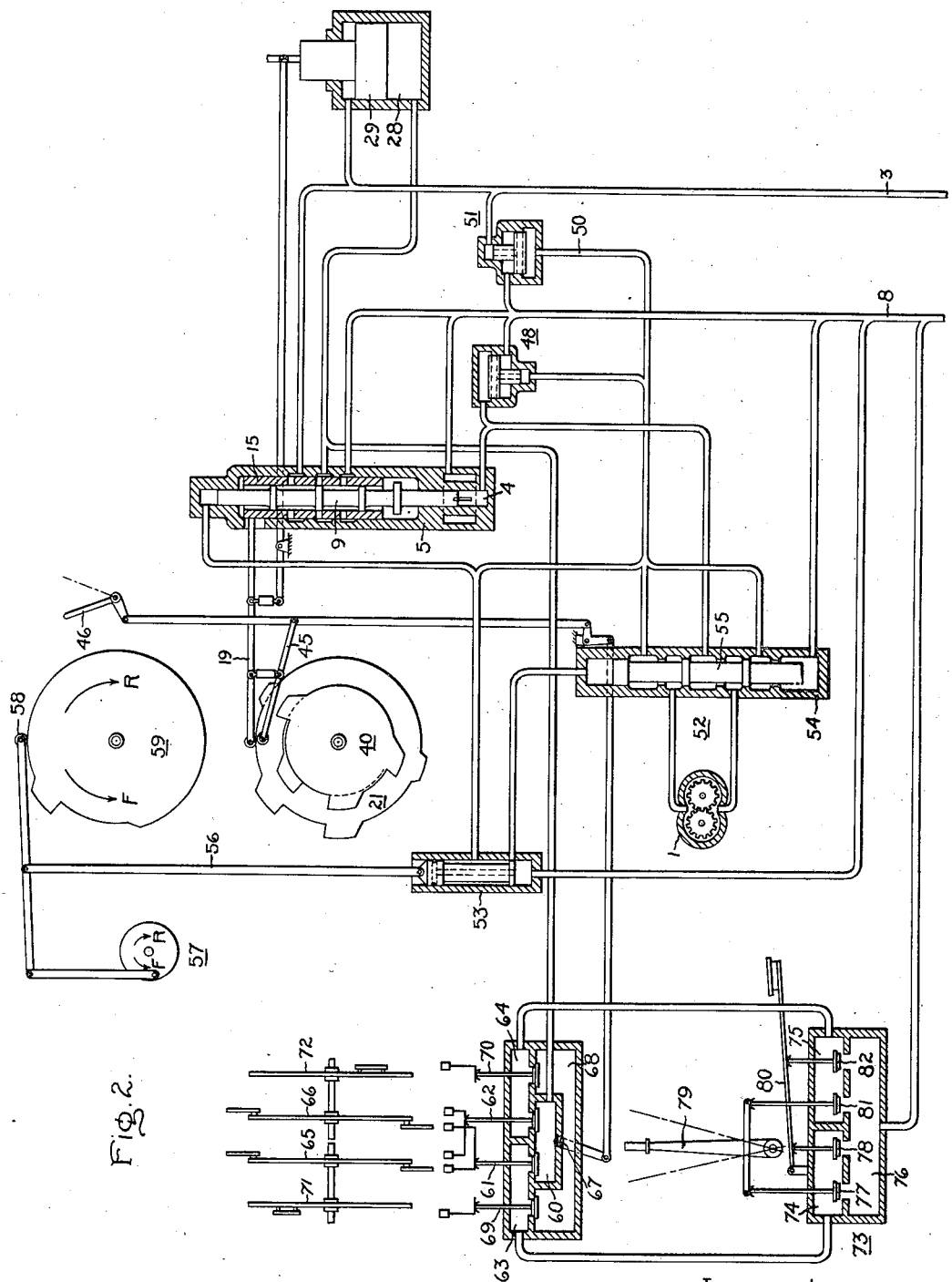

The invention is illustrated by way of example in the accompanying drawings which show in diagrammatic form the layout and arrangement of two forms of braking equipments for colliery winding gear according to the invention, the equipment illustrated in Fig. 2 being different in respect to the form and arrangement of certain parts of the equipment illustrated in Fig. 1 and being rather more complete as regards subsidiary aspects of the invention which are not illustrated in Fig. 1. In the figures like parts are indicated by like reference characters.

Referring to Fig. 1 of the drawings the rotary fluid pump 1, which is adapted to be driven conveniently through gearing from the winder drum (not shown) so that its speed corresponds with that of the winder cage, is connected on its inlet side (assuming the rotational direction of the pump is as indicated by the arrows) through a changeover valve 2 to a main supply of fluid under pressure delivered through the fluid pipe 3. The pipe 3 may for instance be connected to an accumulator into which oil or any other suitable liquid, hereinafter referred to as oil, is pumped whereby its pressure is maintained constant. The outlet side of the pump, also with the assumed directional rotation as indicated by the arrows, is connected through the changeover valve 2 to a cylinder 4 with vertical axis which is formed in the bottom of a cylindrical housing 5. The pump is preferably of a positive delivery type, that is to say, the amount of fluid it passes is determined by its speed and is substantially unaffected by such small variations in the pressure difference to be overcome as may be expected to arise. Moreover, the pump is intended to function as a metering device, and the use of the term "pump" does not imply that an additive pressure is necessarily contributed by the device.

The oil delivered by the pump into the cylinder 4 can escape through a longitudinal orifice 6, which is formed in the wall of the cylinder 4, into a drain space 7 in the housing 5 and thence to a drain pipe 8. The orifice 6 will be covered to an extent dependent upon the position of the bottom of a plunger 9 which is located in the housing 5 and whose lower part 10 forms a piston sliding in the cylinder 4 while its upper part 11 forms a piston sliding in an upper cylinder 12 in the housing 5. The cylinder 12 is in communication with the oil supply pipe 3 whereby the pressure in said cylinder is maintained equal to the pressure on the inlet side of the pump. With this arrangement the plunger 9 will be in equilibrium when the upward force on the piston end 10 in the lower cylinder 4 is equal to the downward force acting on the piston end 11 in the upper cylinder 12 together with the weight of the plunger. By suitable choice of the dimensions of the cylinders 4 and 12 this equilibrium condition may be made to obtain when the pressure in the lower cylinder 4 is the same as that of the main oil supply 3. The actual pressure at any instant in the lower cylinder 4 is that pressure which is sufficient to force the oil flow from the pump 1 through the uncovered portion of the escape orifice 6. If this pressure is above that corresponding to the plunger 9 being in equilibrium the plunger will be forced upwards until the escape orifice is sufficiently large to pass the oil flow at the equilibrium pressure; conversely if this pressure is below the equilibrium pressure the plunger 9 will be forced downwards by the pressure in the upper cylinder 12 until the escape orifice 6 is sufficiently reduced. In other words the plunger 9 will take up a position such that the escape orifice 6 will pass the oil flowing from the pump, and the position of the plunger is therefore dependent upon the rate of flow of oil through the pump.

The escape of oil from the cylinder 4 through the orifice 6 may be calibrated in any desired manner. For instance, by arranging that the escape orifice 6 extends in the axial direction of the cylinder 4 and is provided with a uniform width the position of the plunger 9 may be made to vary approximately as a linear function of the speed of the cage. By varying the width of the orifice 6 at different heights any other desired relation between the lift of the plunger 9 and the speed of the cage may be attained. Clearly the orifice need not be in the cylinder wall but in a separate device teed onto the supply pipe to 4 and suitably controlled from 9.

It will be observed that with the above arrangement, although the pressure difference across the escape orifice 6 may be large, being in fact equal to the difference between the pressure of the oil in the supply pipe 3 and that of the oil in the drain pipe 8, the pressure difference across the pump 1 is very small, it only being necessary that a sufficient increase in pressure in cylinder 4 becomes available upon undue obstruction to flow arising, to overcome the friction of the floating piston 10: such increase may be due to a positive increase of pressure produced by the pump or a decrease in the pressure absorbed by the fluid flow through the metering device referred to as a "pump". The oil delivery of the pump 1 is therefore practically proportional to the speed of the pump and consequently to the speed of the cage or skip even at comparatively low speeds, which is not the case if the pressure difference across the pump is large.

Interposed between the plunger 9 and the surrounding housing 5 is a sleeve 15 which is provided with ports 16, 17 and 18 respectively. The sleeve 15 is adapted to be moved in accordance with the position of the cage or skip in its travel and for this purpose it is coupled through a lever 19 to a roller 20 riding on a cam disc 21 having two cams 22 and 23 and an intermediate portion 24. The disc 21 is driven conveniently by the depth indicator (not shown) of the winder installation so that one complete revolution of the disc represents the complete travel of the cage between top and bottom banks. The cams 22 and 23 correspond to the acceleration and deceleration periods at the respective ends of the travel of the cage or skip and the portion 24 corresponds to the steady part of the travel of the cage at maximum speed intermediate the accelerating and decelerating parts of the travel. In the case considered the profile of the cams 22 and 23 is such that the sleeve will be lowered as the cage approaches the bank at either end of its travel and correspondingly raised when the cage moves away from the bank.

The wall of the housing 5 surrounding the plunger and ported sleeve 15 is provided with spaces 25, 26 and 27. The space 25 is connected to the oil supply pipe 3, the space 26 is connected to the cylinder 28 of a fluid operated relay for controlling the application of the brake as presently to be described, and the space 27 is connected to the drain pipe 8. The arrangement is such that with the setting of the sleeve 15 adjusted by the cam disc 21 to correspond to the position of the cage at any particular time, and assuming that the cage, at that time, is operating at a speed (prescribed by the size of the escape orifice 6) appropriate to that point in the travel of the cage and hence to the assumed setting of the sleeve, the plunger 9 will close the port 17 in the sleeve 15. Accordingly the spaces 25, 26 and 27 are isolated from one another. When however the plunger 9 rises to a greater height than corresponds to the setting of the sleeve 15, as it will do if the actual speed of the cage is greater than the speed prescribed for that particular point in its travel, the port 17 will be uncovered thereby to put the spaces 26 and 27 in communication with one another. Under these circumstances oil is released from the oil relay cylinder 28. A fall of the plunger 9 below the sleeve setting—corresponding to the condition when the actual speed of the cage at the point in its travel appropriate to the sleeve setting is less than the speed prescribed for that point—the port 17 will be uncovered thereby to interconnect the spaces 25 and 26 in the housing 5. Under these circumstances oil under pressure is admitted to the oil relay cylinder 28.

In other words, the plunger 9 and ported sleeve 15 will function as a relay for regulating the application of the brake, which relay is operable, when the speed of the cage exceeds a prescribed value, to supply pressure oil to the cylinder 28 of the brake applying relay, but the setting of which regulating relay is controlled in accordance with the position of the cage in its travel, the setting of the relay being in fact varied by adjustment of the setting of the ported sleeve 15 by the cam means described.

By controlling the admission of oil to, and discharge of oil from, the cylinder 28 of the brake applying relay the regulating relay controls said brake applying relay so that the movement of the operating piston 29 of the latter from the normal or zero position shown is proportional to the amount of overspeed of the cage or skip and this movement is utilized to apply the appropriate intensity of braking effect. The regulating relay acting on the brakes through the brake applying relay will function in such a way as to restrain the speed of the cage within the limit prescribed for each point in the wind and to cause the brake to be released when the speed falls below this limit.

The fluid operated relay to and from the cylinder 28 of which oil is admitted and discharged by the regulating relay just referred to, may operate the brake in any convenient manner. In the arrangement being considered oil under pressure from the supply pipe 3 is normally admitted to the upper side of the piston 29 operating in the cylinder 28 thereby to provide in effect a resilient stop against which the pressure of oil admitted to the underside of the piston 29 by the regulating relay acts to hold off the brake. The rod of the piston 29 is connected to one end of lever 30 which is intermediately connected by a link 31 to the brake engine control valve 32 while at its other end the lever 30 is connected through a link to a manual or pedal operated lever 33 suitably biased into the off position shown. The arrangement is such that in the normal unoperated condition of the oil relay 28, 29 the brake can be applied by the manual or pedal operated control lever 33. When oil is discharged from the oil relay cylinder 28 as described the brake is applied independently of the manual control lever 33 and moreover it is to be noted that in this condition the manual control lever 33 cannot be effective to reduce the braking effect obtained by the relay although it can be effective to increase the braking effect, this by virtue of the lever connection between the oil relay piston 29, the control lever 33 and the brake valve 32.

With a view to obtaining stability of regulation the oil relay piston 29 is conveniently connected through a follow-up lever 34 to the cam operated lever 19 and therewith to the sleeve 15 so as to impart a compensating action to the latter.

In order that an application of the brake may be effected in the event of emergency a changeover valve 36 is included in the connection over which the regulating relay controls the supply of oil to, and the discharge of oil from, the brake applying relay cylinder 28. In one position the valve 36 is effective to pass oil from the space 26 in the housing 5 to the relay cylinder 28 while in its other position the valve 36 is effective to interrupt this connection and to connect the relay cylinder 28 to the drain pipe 8. The valve 36 is operated by a weighted plunger 37 which is controlled by a solenoid 38. Conveniently the solenoid 38 may be arranged to hold up the plunger 37, thereby to retain the valve 36 in position to circulate oil from the housing 5 to the oil relay cylinder 28 under normal conditions, but on the occurrence of an emergency to release the plunger 37 thereby to actuate the valve to its other position for connecting the oil relay cylinder 28 to the drain pipe 8 and discharging said cylinder so that the brakes are applied with full braking effect.

In the winder installation being considered, it is contemplated that the cage or skip should be accelerated and braked at different rates on different occasions as for instance when men are being hauled as distinct from material. To allow of the imposition of a lower rate of deceleration on the cage when the latter is employed for hauling men, there is provided an additional cam disc 40 driven by the depth indicator, as in the case of the cam disc 21, and engaged by a roller 41 adapted to control the setting of the ported sleeve 15. The cam disc 40 is provided with cams 42, 43, and 44, similar to the cams 22, 23 and 24 on the cam disc 21, but providing for correspondingly slower rates of cam lift than in the case of the cam disc 21. The cam roller 41 is connected to a lever 45 which is coupled to the manually operable bell crank lever 46 and is provided with a stop 47 engageable with lever 19, whereby when the manually operable lever 46 is actuated from the normal position shown to the position indicated in dotted line the control of the sleeve 15 by the cam disc 21 is interrupted and the cam disc 40 is rendered effective thereafter to control the position of said sleeve.

The equipment also includes a relief valve 48 which is so connected in the circuit of the oil pump 1 that it is differentially responsive to the oil pressure in the cylinder 4 on the one hand and the pressure in the oil supply pipe 3 on the other hand. The valve is adjusted so as normally to be closed, but to be opened when the oil pressure in the cylinder 4 falls to a predetermined fraction of the pressure in the oil supply pipe 3 and when so opened to pass oil from the supply pipe 3 to the cylinder 4 and to the pump. The purpose of the relief valve 48 is to prevent suction of air through leakage spaces into the cylinder 4 when the rotational direction of the pump 1 is changed without a corresponding change being effected in the changeover valve 2 so that in these circumstances the pump is operating to withdraw fluid from the cylinder 4.

It will be observed that by means of the arrangement thus described the permitted maximum speed of the cage or skip may at all times be correlated with the position of the cage or skip in respect of its complete travel over a large working range of speeds.

The equipment illustrated in Fig. 2 is very similar in respect of the main details to that just described in connection with Fig. 1, so that only the chief points of difference and additional features will be referred to in connection with Fig. 2.

In the equipment illustrated in Fig. 2 the brake applying relay 28, 29 is adapted to be operated by high pressure oil. Thus the relay cylinder 28 is connected on the upper side of its operating piston 29 to the high pressure oil supply pipe 3. On the lower side of the piston 29 the cylinder 28 is adapted to be connected by the regulating relay 5, 9, 15 alternatively to the high pressure side for relieving the brake and to the drain pipe 8 for applying the brake. The other parts of the equipment which are operated by pressure fluid are supplied with oil at a pressure intermediate the said high pressure oil and that of the drain, from a supply pipe 50 which is fed from the high pressure supply pipe 3 through the reducing valve 51.

Instead of the changeover valve 2 employed in the equipment of Fig. 1, there is utilized in the equipment being described, a directional valve 52 and a directional pilot valve 53. The directional valve 52 comprises a cylindrical housing 54 and a plunger 55 operating therein, the housing being ported and connected to the oil circulating system so that in the position of the plunger 55 shown, oil is circulated from the supply pipe 50 in one direction through the pump and thence to the cylinder 4 in the regulating relay housing 5 and reverse relief valve 48, while when the plunger 55 is in the raised position the direction of oil flow through the pump is reversed. The valve 52 is so adjusted that the plunger 55 is normally held in the raised position by the natural out of balance of the valve, being caused to move to the lower position (shown) by the admission of pressure oil to the valve housing 54 at the upper end of the plunger 55, by the directional pilot valve 53.

The directional pilot valve is operated by a member 56 which is responsive to the co-ordinated movement of a friction clutch 57 driven from the winder drum and a cam roller 58 engaging with a cam disc 59 which is reversible with the winder drum. The arrangement of the directional pilot valve with the friction clutch 57 and cam means 58, 59 is such that during the retardation period of the cage, that is when the cage is approaching bank, the directional pilot valve cuts off the supply of pressure oil to the upper side of the directional valve plunger 55 and the directional valve is thus retained in its position shown, corresponding say, to forward operation of the pump 1. With the cage moving away from bank, that is during the accelerating period, the directional pilot valve 53 is maintained unoperated thereby still to interrupt the supply of pressure oil to the upper side of the directional valve 55 plunger 55. Accordingly the directional valve remains unactuated. As, however, the pump 1 is now operating in the reverse direction oil is pumped from the regulating relay cylinder 4. Under these circumstances the regulating relay plunger 9 is held in its lowest position, thus allowing of a greater rate of acceleration of the cage than the corresponding rate of deceleration imposed by the control of the cam discs 21 and 40 on the regulating relay and therewith the brake application. At the end of the acceleration period, the directional pilot valve 53 is effective to cause pressure oil to be supplied to the upper side of the directional valve plunger 55 whereupon the directional valve will be actuated to interchange the inlet and outlet sides of the pump so that the direction of flow of oil through the pump will be reversed correspondingly with the reversed direction of operation of the cage and therewith the pump.

In this equipment, provision is made for applying the brakes when an overwinding condition occurs. Thus, the oil relay cylinder 28 is connected on the underside of its piston 29 with a chamber 60 provided with discharge valves 61 and 62 whereby said chamber can be put into communication with the respective drain spaces 63 and 64. The valves 61 and 62 are operated by respective cams 65 and 66 which are driven in opposite directions from the winder drum. Thus when an overwind takes place in one direction, say forward operation of the cage, the cam 65 causes the valve 61 to open, thereby to discharge oil from the chamber 60 and consequently from the brake applying oil relay cylinder 28 whereby the brakes are applied. Similarly, when an overwind condition takes place during winding in the opposite or reverse direction, the cam 66 opens the valve 62 thereby to discharge oil from the chamber 60 and thus from the oil relay cylinder 28 whereby the brakes are applied.

In cases where the landing point for men is below that for the discharge of material, such as by the tipping of a skip, it is necessary that the overwind protection shall come into action at an earlier point in the wind when men are being hauled than when material is being hauled. With this object in view the chamber 60 is adapted to be put into connection through valve 67, which conveniently under the control of manually operable lever 46 is opened when men are being hauled but closed when material is being hauled, with the larger chamber 68. The chamber 68 is provided with discharge valves 69 and 70 which are normally closed, but are adapted to be opened by respective cams 71 and 72 which are driven in opposite directions by the winder drum. The cams 71 and 72 are arranged to open the valves 69 and 72 at respective earlier points in the wind than the points at which the cams 65 and 66 open the valves 61 and 62. The arrangement is such that when an overwind in the forward direction takes place the cam 71 opens valve 69 thereby to discharge the chambers 60 and 68 and the oil relay cylinder 28, thus causing a brake application, while when an overwind condition occurs in the reverse direction of wind, the cam 72 opens valve 70 thereby to discharge chambers 60 and 68 and thus the oil relay cylinder 28 so as to cause a brake application. As will be seen the valve 67 renders ineffective the main overwind cams 71 and 72 when winding material.

For the purpose of releasing the brake after an application thereof which is the result of an overwind condition, there is provided a backing out valve device 73. This valve device comprises a chamber 74 which is connected with the aforesaid chamber 63, a chamber 75, connected to the aforesaid chamber 64, and a drain space 76 which is connected to the drain pipe 8. The chamber 74 is adapted to be put in connection with the drain space 76 by means of valves 77 and 78. The valve 77 is controlled by the manually operable reversing lever 79 and the valve 78 is controlled by a pedal operated lever 80. Similarly, the chamber 75 is adapted to be put in communication with the drain space 76 by means of valves 81 and 82 of which valve 81 is controlled by the reversing lever 79 and the valve 82 is controlled by the pedal operated lever 80. The backing out valve functions in this manner. Assuming that with the cage operating in, say, the forward direction, and an overwind condition has resulted in the valve 61 or 69 (depending on whether material or men are being hauled) being opened thereby to cause application of the brakes, then in order to restart the cage it is necessary to move the manually operable lever in the direction to close the valve 77 and for the pedal lever 80 to be operated to close the valve 78. The new position of the control lever 79 will be that corresponding to the reverse direction of wind. As a result of closure of the valves 77 and 78 the chamber 74 will be cut off from the drain space 76 and accordingly the chamber 63 and thus the chamber 60 (or 68) will be cut off from the drain pipe thus cutting off the discharge of oil from the relay cylinder 28 thereby to cause release of the brake. Should the brake have been applied as a result of valve 62 or 70 having been opened by an overwind in the reverse direction, then in order to restart, the reversing lever must be actuated to the position in which it closes valve 81, this position corresponding to forward operation of the cage, and the pedal lever 80 must be operated to close valve 82, thus to cut off from drain the chamber 60 (or 68) and the oil relay cylinder 28, whereby the brakes are released. The interlocking afforded by the backing out valve between the brake applying relay 28, 29 and the reversing lever 79 ensures that after an overwind condition has resulted in the brake being applied the cage or skip can only be restarted in the reverse direction to that in which it had been travelling prior to the brake application.

It is to be understood that the invention is not limited to the specific arrangements described, but that many modifications may be made to the construction, arrangement and operation of the gear without departing from the invention.

What I claim as new and desire to secure by Letters Patent of the United States is:

1. In or for a winder or like installation, braking equipment in which fluid taken from a pressure source and discharged to an exhaust is circulated through a system comprising a metering device or pump which passes the fluid at a rate substantially proportional to or representative of the speed of the cage or other moving apparatus but imposes a positive or negative pressure difference on the circulating fluid which is small in comparison with that between source and exhaust and in series with said metering device or pump a throttling orifice the size of which is controlled by a piston member in equilibrium under the differential pressure across the metering device or pump, the piston member co-operating with an independently actuated sleeve member to constitute in combination therewith relay means for controlling or regulating, by the movement of said piston member relatively to said sleeve member, the application of braking effect.

2. Braking equipment according to claim 1, in which the position of the sleeve member varies in accordance with the position of the cage or other moving apparatus in its travel and the piston member co-operates with ports in said sleeve member to control the supply of pressure fluid to and discharge of fluid from a fluid operated relay for causing application of the brake with a braking effect which is variable in accordance with the relative displacement between the plunger and the ported sleeve member.

3. In or for a winder or like installation braking equipment comprising a metering device or pump adapted to be driven at a speed proportional to or representative of that of the cage or other moving apparatus, a cylinder to which fluid under pressure is delivered by the metering device or pump and which is provided with a discharge orifice the size whereof is regulated by a piston operating in the cylinder under the differential action of the pressure of fluid supplied to the cylinder by the metering device or pump and the pressure of fluid on the inlet side of the metering device or pump so that the position of said piston is substantially dependent upon the speed of the cage or other moving apparatus at all speeds thereof, and relay means for regulating the application of the brake, which relay means is actuable by said piston at a setting which is variable in accordance with the position of the cage or other moving apparatus.

4. Braking equipment according to claim 3, wherein the brake regulating relay means comprises a plunger connected to or otherwise forming part of the piston whose position is dependent upon the speed of the cage or other moving apparatus, and an associated ported sleeve member whose position varies in accordance with the position of the cage or other moving apparatus in its travel and which co-operates with the plunger to control the supply of pressure fluid to and discharge of fluid from a fluid operated relay for causing application of the brake with a braking effect which is variable in accordance with the relative displacement between the plunger and the ported sleeve member.

5. Braking equipment according to claim 1 wherein a changeover valve is included in the circuit in which fluid is circulated by the metering device or pump, said changeover valve being actuated from one position to another corresponding to the rotational direction of the metering device or pump so as to interchange the inlet and outlet sides of the metering device or pump.

6. In braking equipment for hoists and the like, means for circulating fluid in accordance with the speed of the hoist, a discharge outlet for said fluid, a piston movable under the pressure of said fluid for varying said discharge outlet, and means controlled by said piston for controlling said braking equipment.

7. In braking equipment for hoists and the like, means for circulating fluid in accordance with the speed of the hoist, a discharge outlet for said fluid, a piston movable under the pressure of said fluid for varying said discharge outlet, a ported sleeve surrounding said piston, and means dependent upon the relative position of said piston and said sleeve for controlling said braking equipment.

8. In braking equipment for hoists and the like, means for circulating fluid in accordance with the speed of the hoist, a discharge outlet for said fluid, a piston movable under the pressure of said fluid for varying said discharge outlet, a ported sleeve surrounding said piston, a fluid relay dependent upon the relative position of said piston and said sleeve for controlling said braking equipment, and means for varying the position of said sleeve in accordance with the position of the hoist whereby the control of the braking equipment is varied.

9. In braking equipment for hoists and the like, means for circulating fluid in accordance with the speed of the hoist, a discharge outlet for said fluid, a piston movable under the pressure of said fluid for varying said discharge outlet, a ported sleeve surrounding said piston, a fluid relay dependent upon the relative position of said piston and said sleeve for controlling said braking equipment, means for varying the position of said sleeve in accordance with the position of the hoist whereby the control of the braking equipment is varied, and a follow-up mechanism connecting the fluid relay and the ported sleeve for stabilizing the action of the sleeve.

10. In braking equipment for hoists and the like, a source of fluid, a cylinder, a pump for circulating fluid from said source to the cylinder in accordance with the speed of the hoist, a discharge outlet for said fluid, a piston movable in said cylinder under the pressure of said fluid for varying said discharge outlet, means controlled by said piston for controlling said braking equipment, means including a reversing valve for preventing reversal of the direction of circulation of fluid by said pump upon reversal of the direction of rotation of said pump, and a relief valve in said cylinder for preventing pumping of fluid from said cylinder upon failure of said reversing valve to operate.

11. In braking equipment for hoists and the like, a source of fluid, a cylinder, a pump for circulating fluid from said source to the cylinder in accordance with the speed of the hoist, a discharge outlet for said fluid, a piston movable in said cylinder under the pressure of said fluid for varying said discharge outlet, means controlled by said piston for controlling said braking equipment, and means including a reversing valve for preventing reversal of the direction of circulation of fluid by said pump upon reversal of the direction of rotation of said pump.

DAVID M. SMITH.